Patented Feb. 17, 1948

2,436,213

UNITED STATES PATENT OFFICE 2,436,213

SYNTHETIC RUBBERLIKE MATERIALS COMPRISING FLUOROPRENE

Frederick B. Hill, Jr., Wilmington, Del., assignor to E. I. du Pont de Nemours & Company, Wilmington, Del., a corporation of Delaware No Drawing. Application June 15, 1944, Serial No. 540,539

8 Claims. (Cl. 260—84.5)

This invention relates to an improvement in synthetic rubber-like materials, and more particularly to those prepared by polymerizing a mixture of fluoroprene (2-fluoro-1,3-butadiene) and a butadiene hydrocarbon, together with a small amount of selected vinylidene compounds.

Fluoroprene (2-fluoro-1,3-butadiene), when polymerized, gives a synthetic rubber-like material which, on vulcanization, resists hardening and embrittlement at low temperatures and, at the same time, resists swelling in oils to a moderate although very important degree.

Since many applications of rubber-like materials that require a retention of softness and flexibility at low temperatures also require a resistance to the swelling and deteriorating action of oils, as in aeroplane and automotive parts, there is a demand for elastic materials that possess both freeze- and oil-resistance. The temperature range over which these materials should remain flexible is constantly being lowered so that the demand for still more freeze-resistant rubber-like materials with resistance to the deleterious effect of oils is increasing. Within limits, some specifications for rubbers for use where low temperatures are encountered can be satisfied by altering the compounding of the present available freeze-resisting materials, as by incorporating softening agents. Other low temperature requirements, particularly when combined with the need for oil-resistance, cannot be met by the existing materials. The most freeze-resistant rubbers known are not oil-resistant, and the oil-resistant rubber-like materials are deficient, or only moderately good, in freeze-resistance. Therefore, new types of polymerized substances must be found in order to extend effectively the low temperature range over which elastic materials, that must withstand contact with oil without harmful effect, can be used.

It is therefore an object of the present invention to produce rubber-like materials from fluoroprene whose vulcanizates possess improved freeze-resistance and moderately good oil-resistance. Another object is to provide rubber-like materials with improved processing characteristics and tensile properties. Another object is to improve the production of these materials from the manufacturing standpoint.

I have found that valuable synthetic rubberlike materials, whose vulcanizates possess improved freeze-resistance and good oil-resistance as well as good tensile properties and processing characteristics, can be produced by polymerizing a mixture of fluoroprene and butadiene hydrocarbons, more particularly butadiene-1,3 itself, together with a relatively small amount of selected vinylidene compounds. The vinylidene compounds, which when combined with the fluoroprene-butadiene mixture give products having these desired characteristics, are those which have the general formula:

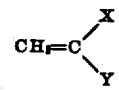

wherein X is hydrogen or methyl radical and Y stands for an aryl radical of the benzene or naphthalene series, —COOR₁ or the radical

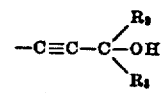

wherein $R_1$ stands for an alkyl chain containing not more than ten carbon atoms, or a monocyclic cycloalkyl radical, and $R_2$ and $R_3$ stand for hydrogen, an alkyl group containing not more than ten carbon atoms or where $R_2$ and $R_3$, together with the C-atom to which they are attached, stand for a cycloaliphatic hydrocarbon radical containing not more than 10 carbon atoms.

Interpolymers of butadiene and fluoroprene display a greater freeze-resistance than the polymer from fluoroprene alone. If the amount of butadiene is approximately one-third that of the fluoroprene, a very substantial improvement in the freeze-resistance is found without much impairment of the oil-resistance. However, polymers from two component mixtures of fluoroprene and butadiene, made by present known methods, are not of the desired quality with regard to processing and tensile strength. These disadvantages are overcome by adding one of the above vinyl compounds in an amount equal to about one-twentieth of the fluoroprene-butadiene mixture. From the three component mixture there is obtained a high yield of product within practical operating time limits that possesses an improved softness and smoothness that make it easier to handle in washing, milling, compounding, calendering, sheeting and the like. In addition, compounded and vulcanized specimens of the three component polymer retain their flexibility at lower temperatures better than polymers from fluoroprene alone or from two component mixtures of fluoroprene and polymerizable vinyl compounds. They also exhibit moderate oil-resistance, high tensile strength and high resilience.

The following examples are given to illustrate the invention. The parts used are by weight, unless otherwise specified.

*Example 1*

A mixture of 70 parts of fluoroprene, 25 parts of butadiene and 5 parts of styrene containing 0.6 part of a mixture of straight chain primary mercaptans containing an average of 13 carbon atoms, 3 parts of oleic acid and 3 parts of Nancy Wood rosin, was emulsified in a solution made by dissolving 1.80 parts of sodium hydroxide, 1 part of potassium persulfate, 1 part of the sodium salts of the dinaphthyl methane sulfonic acids prepared from naphthalene, formaldehyde and sulfuric acid, and 0.15 part of potassium ferricyanide in 150 parts of water. The emulsion was then heated for 23 hours at 25° C. The apparatus in which the emulsification and polymerization were carried out consisted of sealed glass tubes that were continuously rotated end-over-end in a water bath maintained at 25° C. The resulting latex was treated with 6 parts of a 50% aqueous dispersion of a 45:55 mixture of diphenylamine and phenyl-alpha-naphthylamine and coagulated by the addition of a solution of sodium chloride and acetic acid. The coagulum was then washed with warm water on a rubber mill fitted with a corrugated roll and then dried on a warm rubber mill with smooth rolls. Ninety-seven parts of a plastic rubber-like product were obtained. The dried polymer was compounded for testing with 40 parts of reinforcing carbon black, 5 parts of zinc oxide, 1.0 part of sulfur, 1 part of stearic acid, 1 part of phenyl-alpha-naphthylamine, 1.0 part of tetramethyl thiuram monosulfide, and 2 parts of the condensation product of formaldehyde and aniline for each 100 parts of polymer and was cured for 20 minutes at 60 pounds steam pressure (153° C.).

The vulcanized product had a tensile strength of 2870 pounds per square inch with an elongation at break of 600%. The brittle point, as determined by the ASTM-SAE bent loop method (described on page 279 of ASTM-Standards on Rubber Products, Feb. 1943) was −80° F. (−62° C.). The temperature (T–10) at which 10% retraction of a frozen stretched specimen occurred on warming was −52° C. This measure of elasticity at low temperatures was obtained by stretching the sample 170% of its original length, cooling to −70° C., and permitting it to contract freely with a slow rise in temperature. The per cent volume increase during immersion in kerosene for 48 hours at 100° C. was 114%. The resilience was 37% rebound, measured by the Schopper tester.

A comparison of the product of this example with related elastomers reveals the advantages of the new product. For example, the three component polymer coheres well on the wash mill, whereas the polymer from a mixture of 70 parts of fluoroprene and 30 parts of butadiene tends to crumble and coheres with difficulty. The dry three-component polymer is softer and gives a more even bend on a smooth mill than the two-component product which tends to be tough and nervy and to form a rough band. This improved millability is technically important because it makes the fabrication of rubber articles easier and less costly. The tensile strength of the fluoroprene-butadiene product produced under similar conditions was 1730 pounds per square inch at an elongation at break of 320%. In making a comparison with the polymer from fluoroprene alone, it is found that polyfluoroprene has a T–10 value of −48° C. and a brittle point of −70° F. (−57° C.). The freeze-resistance of the commercial butadiene and styrene interpolymer known as Buna S and of Hevea rubber, is about equal to that of the product from the mixture of fluoroprene, butadiene and styrene as measured by the ASTM-SAE bent loop test, but these elastomers swell in kerosene to a considerably greater extent and suffer more deterioration than the three-component fluoroprene polymer of Example 1.

*Example 2*

Proceeding as in Example 1 except that the styrene was replaced by dimethyl vinylethynyl carbinol, gave 94 parts of a good processing polymer in both a wet and dry condition whose vulcanizate had a tensile strength of 3120 pounds per square inch at 600% elongation, a brittle point of −80° F. (−62° C.), a T–10 value of −54° C., a volume increase of 108% in kerosene, and a rebound of 40%.

*Example 3*

Proceeding as in Example 1 except that the styrene was replaced by butyl methacrylate, gave 96 parts of a good processing polymer in both a wet and dry condition, whose vulcanizate had a tensile strength of 2470 pounds per square inch at 520% elongation, a brittle point of −80° F. (−62° C.), a T–10 value of −53° C., a volume increase of 113% in kerosene, and a rebound of 39%.

*Example 4*

Proceeding as in Example 1 except that the butadiene was replaced with isoprene, the styrene was replaced with dimethyl vinylethynyl carbinol and the polymerization was carried out for 18 hours at 30° C., gave 98 parts of a good milling product whose vulcanizate had a tensile strength of 1820 pounds per square inch at 300% elongation, a T–10 value of −48° C., a volume increase of 88% in kerosene, and a rebound of 35%.

*Example 5*

A mixture of 75 parts of butadiene, 20 parts of fluoroprene and 5 parts of butyl methacrylate containing a mixture of mercaptans, oleic acid and Nancy wood rosin, was emulsified in a solution made by dissolving sodium hydroxide, potassium persulfate, sodium dinaphthylmethane sulfonate and potassium ferricyanide in water, as given in Example 1. The mixture was polymerized for 18 hours at 40° C. and then 6 hours at 50° C., and the latex treated as described in Example 1. A yield of 89 parts of very good milling polymer was obtained. When compounded as in Example 1 and cured 60 minutes at 60 pounds steam pressure, the product had a tensile strength of 1650 pounds per square inch at 440% elongation, and a rebound of 40%. The material had an exceptionally low retraction temperature (T–10), viz. −66° C., and swelled 179% in kerosene in 48 hours at 100° C.

Substituting either styrene or dimethylvinylethynyl carbinol for the butyl methacrylate in Example 5 and proceeding as outlined, gave similar yields of equally good processing polymer whose vulcanizates exhibited similar properties.

The butadiene hydrocarbons to be copolymerized with the fluoroprene may be either the 1,3-butadiene itself, or any of the aliphatic 1,3-butadienes containing not more than 6 carbon atoms, and more particularly, such beta-methyl substituted 1,3-butadienes such as isoprene, 2,3-dimethyl-1,3-butadiene or 4-methyl-1,3-pentadiene. The 1,3-butadiene, however, is preferred to the substituted butadienes, because substituted butadienes do not give as high a degree of freeze-resistance, where equal weights of the same are used, as can be obtained with the butadiene itself.

In place of styrene, other vinyl hydrocarbons such as vinyl naphthalene, vinyl furane and alpha-methyl-p-methyl styrene, may be used. The class of carbinols, of which dimethylvinylethynyl carbinol is an example, are effective and includes such compounds as methylethyl vinylethynyl carbinol, dimethyl-isopropenylethynyl carbinol, 1-(vinylethynyl) cyclohexanol, methyl-phenyl-vinylethynyl carbinol, 1-(vinylethynyl) borneol and furyl vinylethynyl carbinol. Instead of butyl methacrylate, other esters of acrylic acid and of substituted acrylic acids may be used to improve the processing characteristics and tensile strength of fluoroprene-butadiene interpolymers. For example, methyl, ethyl, butyl or isobutyl acrylates, methyl, ethyl or cyclohexyl methacrylates, methyl or isoamyl ethacrylates and the like, are applicable. Butyl methacrylate is preferred. Although the present invention contemplates the use, as a third component, of those vinylidene compounds more particularly formulated above, it is of course recognized that other materials, such as the acrylo- or alkacrylonitriles, can also be used to modify the characteristics of the fluoroprene-butadiene elastomers.

The composition of the starting mixture of polymerizable materials may be varied from 15 to 80 parts of fluoroprene, 80 to 15 parts of butadiene, and about 5 parts of the vinylidene compound. The vinylidene compound, when employed in an amount equal to about 5% of the mixture, improves the mill behavior and tensile strength of the polymer and does not adversely affect the freeze-resistance. Larger amounts of the vinyl compound do not further increase the millability and tensile strength, but tend to give it less desirable properties at low temperatures. The preferred compositions are those containing 50%-75% fluoroprene, 45%-20% butadiene and 5% dimethylvinylethynyl carbinol, butyl methacrylate or styrene.

The polymerization may be carried out by any of the methods normally used in preparing chloroprene or butadiene elastomers, although it is preferably carried out in the presence of a mercaptan, which contributes to the plasticity of the product. It is also preferable to polymerize in the presence of a catalyst, such as a combination of a water soluble persulfate and a water soluble complex cyanide, such as potassium ferricyanide, as disclosed in the copending application of Youker Serial No. 445,219, filed May 30, 1942, now Patent No. 2,417,034. Any of the various types of emulsifying agents previously used for the dispersion of polymerizable compounds are suitable, although the use of a combination of a water soluble salt of a fatty acid and similar salt of rosin such as is obtained by neutralizing oleic acid and rosin with sodium hydroxide, is preferred. It is also desirable that the solution be definitely alkaline and that a small amount of the sodium dinaphthyl methane sulfonate be used as an auxiliary emulsion stabilizing agent. Alkalinity corresponding to 0.50% to 0.75% of sodium hydroxide, based on the total weight of monomers, is preferred.

A suitable temperature for carrying out the polymerization is between 20° and 60° C., preferably about 40° C.

Coagulation of the dispersion may be brought about by any of the methods usually employed in the coagulation of chloroprene or butadiene elastomers. For the preferred emulsifying system, sodium chloride and acetic acid are preferred.

The compounding and vulcanizing of the product is carried out along the lines used for natural rubber, and for synthetic rubber derived from butadiene.

I claim:

1. A synthetic, rubber-like material obtained by polymerizing together a mixture of polymerizable monomers consisting of from 15% to 80% of fluoroprene, 80% to 15% of a 1,3-butadiene hydrocarbon containing not more than 6 carbon atoms, and 5% of a vinylidene compound of the formula:

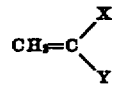

wherein X stands for a member of the group consisting of hydrogen and methyl, and Y stands for a radical of the group consisting of aryl, —COOR₁ and

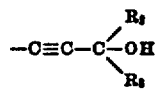

wherein R₁ stands for a radical of the group consisting of alkyl and monocyclic cycloalkyl, and R₂ and R₃ each stands for a member of the group consisting of hydrogen and alkyl, and where R₂ and R₃, together with the C-atom to which they are attached, stand for a cycloaliphatic hydrocarbon radical, and in all cases the alkyl and cycloaliphatic hydrocarbon radicals contain not more than 10 carbon atoms and the aryl radical is of the benzene and naphthalene series.

2. A synthetic, rubber-like material obtained by polymerizing together a mixture of polymerizable monomers consisting of from 15% to 80% of fluoroprene, 80% to 15% of 1,3-butadiene, and 5% of styrene.

3. A synthetic, rubber-like material obtained by polymerizing together a mixture of polymerizable monomers consisting of from 15% to 80% of fluoroprene, 80% to 15% of 1,3-butadiene, and 5% of dimethyl vinylethynyl carbinol.

4. A synthetic, rubber-like material obtained by polymerizing together a mixture of polymerizable monomers consisting of from 15% to 80% of fluoroprene, 80% to 15% of 1,3-butadiene, and 5% of butyl methacrylate.

5. A synthetic, rubber-like material obtained by polymerizing together a mixture of polymerizable monomers consisting of from 50% to 75% of fluoroprene, 45% to 20% of 1,3-butadiene, and 5% of a vinylidene compound of the formula:

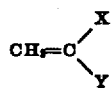

wherein X stands for a member of the group consisting of hydrogen and methyl, and Y stands for a radical of the group consisting of aryl, —COOR₁ and

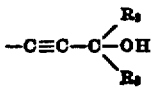

wherein $R_1$ stands for a radical of the group consisting of alkyl and monocyclic cycloalkyl, and $R_2$ and $R_3$ each stands for a member of the group consisting of hydrogen and alkyl, and where $R_2$ and $R_3$, together with the C-atom to which they are attached, stand for a cycloaliphatic hydrocarbon radical, and in all cases the alkyl and cycloaliphatic hydrocarbon radicals contain not more than 10 carbon atoms and the aryl radical is of the benzene and naphthalene series.

6. A synthetic, rubber-like material obtained by polymerizing together a mixture of polymerizable monomers consisting of from 50% to 75% of fluoroprene, 45% to 20% of 1,3-butadiene, and 5% of styrene.

7. A synthetic, rubber-like material obtained by polymerizing together a mixture of polymerizable monomers consisting of from 50% to 75% of fluoroprene, 45% to 20% of 1,3-butadiene, and 5% of dimethyl vinylethynyl carbinol.

8. A synthetic, rubber-like material obtained by polymerizing together a mixture of polymerizable monomers consisting of from 50% to 75% of fluoroprene, 45% to 20% of 1,3-butadiene, and 5% of butyl methacrylate.

FREDERICK B. HILL, JR.

REFERENCES CITED

The following references are of record in the file of this patent:

UNITED STATES PATENTS

| Number | Name | Date |
|---|---|---|
| 1,950,431 | Carothers et al. | Mar. 13, 1934 |
| 2,234,204 | Starkweather et al. | Mar. 11, 1941 |
| 2,378,189 | Clifford et al. | June 12, 1945 |

---

Certificate of Correction

Patent No. 2,436,213.  February 17, 1948.

FREDERICK B. HILL, JR.

It is hereby certified that errors appear in the printed specification of the above numbered patent requiring correction as follows: Column 2, line 30, after the word "atoms" and before the period insert *or where $R_2$ and $R_3$, together with the C-atom to which they are attached, stand for a cycloaliphatic hydrocarbon radical containing not more than 10 carbon atoms*; column 3, line 67, for "bend" read *band*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.* wherein $R_1$ stands for a radical of the group consisting of alkyl and monocyclic cycloalkyl, and $R_2$ and $R_3$ each stands for a member of the group consisting of hydrogen and alkyl, and where $R_2$ and $R_3$, together with the C-atom to which they are attached, stand for a cycloaliphatic hydrocarbon radical, and in all cases the alkyl and cycloaliphatic hydrocarbon radicals contain not more than 10 carbon atoms and the aryl radical is of the benzene and naphthalene series.

6. A synthetic, rubber-like material obtained by polymerizing together a mixture of polymerizable monomers consisting of from 50% to 75% of fluoroprene, 45% to 20% of 1,3-butadiene, and 5% of styrene.

7. A synthetic, rubber-like material obtained by polymerizing together a mixture of polymerizable monomers consisting of from 50% to 75% of fluoroprene, 45% to 20% of 1,3-butadiene, and 5% of dimethyl vinylethynyl carbinol.

8. A synthetic, rubber-like material obtained by polymerizing together a mixture of polymerizable monomers consisting of from 50% to 75% of fluoroprene, 45% to 20% of 1,3-butadiene, and 5% of butyl methacrylate.

FREDERICK B. HILL, JR.

REFERENCES CITED

The following references are of record in the file of this patent:

UNITED STATES PATENTS

| Number | Name | Date |
| --- | --- | --- |
| 1,950,431 | Carothers et al. | Mar. 13, 1934 |
| 2,234,204 | Starkweather et al. | Mar. 11, 1941 |
| 2,378,189 | Clifford et al. | June 12, 1945 |

---

Certificate of Correction

Patent No. 2,436,213.　　　　　　　　　　　　　February 17, 1948.

FREDERICK B. HILL, JR.

It is hereby certified that errors appear in the printed specification of the above numbered patent requiring correction as follows: Column 2, line 30, after the word "atoms" and before the period insert *or where $R_2$ and $R_3$, together with the C-atom to which they are attached, stand for a cycloaliphatic hydrocarbon radical containing not more than 10 carbon atoms*; column 3, line 67, for "bend" read *band*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*